(12) United States Patent
Lin

(10) Patent No.: US 6,925,681 B2
(45) Date of Patent: Aug. 9, 2005

(54) VEHICLE CURTAIN LOCK

(75) Inventor: Chen-Hsing Lin, Dali (TW)

(73) Assignee: Pinnoki Co., Ltd., Dali (TW)

( * ) Notice: Subject to any disclaimer, the term of this patent is extended or adjusted under 35 U.S.C. 154(b) by 5 days.

(21) Appl. No.: 10/446,510

(22) Filed: May 27, 2003

(65) Prior Publication Data

US 2004/0237254 A1 Dec. 2, 2004

(51) Int. Cl.⁷ .............................................. E05D 15/00
(52) U.S. Cl. .................. 16/87 R; 16/87.4 R; 160/196.1
(58) Field of Search ............................ 16/87 R, 87.4 R, 16/91, 93 R, 93 D, 96 R, 106, 199, 210, DIG. 31; 160/196.1, 201, 330, 345, 349.1, DIG. 6; 296/100.01, 190.1, 97.1

(56) References Cited

U.S. PATENT DOCUMENTS

| | | | | |
|---|---|---|---|---|
| 3,879,806 A | * | 4/1975 | Armstrong ...................... | 4/610 |
| 4,769,862 A | * | 9/1988 | Skrzelowski ................... | 4/610 |
| 4,907,637 A | * | 3/1990 | Hintsa ...................... | 160/368.1 |
| 5,332,021 A | * | 7/1994 | Todd et al. .................. | 160/133 |
| 5,421,059 A | * | 6/1995 | Leffers, Jr. ............... | 16/87.4 R |
| 6,431,634 B1 | * | 8/2002 | Ananian ................ | 296/100.12 |
| 6,470,948 B2 | * | 10/2002 | Yates et al. .................... | 160/35 |
| 6,510,566 B2 | * | 1/2003 | Bryce ............................. | 4/609 |
| 6,564,851 B1 | * | 5/2003 | Liao ........................... | 160/330 |

FOREIGN PATENT DOCUMENTS

| | | | | |
|---|---|---|---|---|
| DE | | 2410395 A | * | 9/1975 |
| JP | | 06000122 | * | 1/1994 |

* cited by examiner

Primary Examiner—Robert J. Sandy
Assistant Examiner—Andre' L. Jackson
(74) Attorney, Agent, or Firm—Dellett & Walters

(57) ABSTRACT

A vehicle curtain lock has a U-shaped track, an abutting head, a sliding body, a resilient element and a clasp device. The U-shaped track has an inner channel and a longitudinal opening and slidably holds the sliding body, the abutting head and the resilient element inside the inner channel. The sliding body is mounted against the longitudinal opening to hold the abutting head inside the inner channel. The resilient element is mounted between the sliding body and the abutting head to push the abutting head against the U-shaped track to hold the sliding body in a locked position. The clasp device is connected to the abutting head and has a distal end with a clasp to adapt to secure a curtain. Pulling the clasp device disengages the abutting head from the U-shaped track to allow the sliding body to freely slide along the U-shaped track.

6 Claims, 6 Drawing Sheets

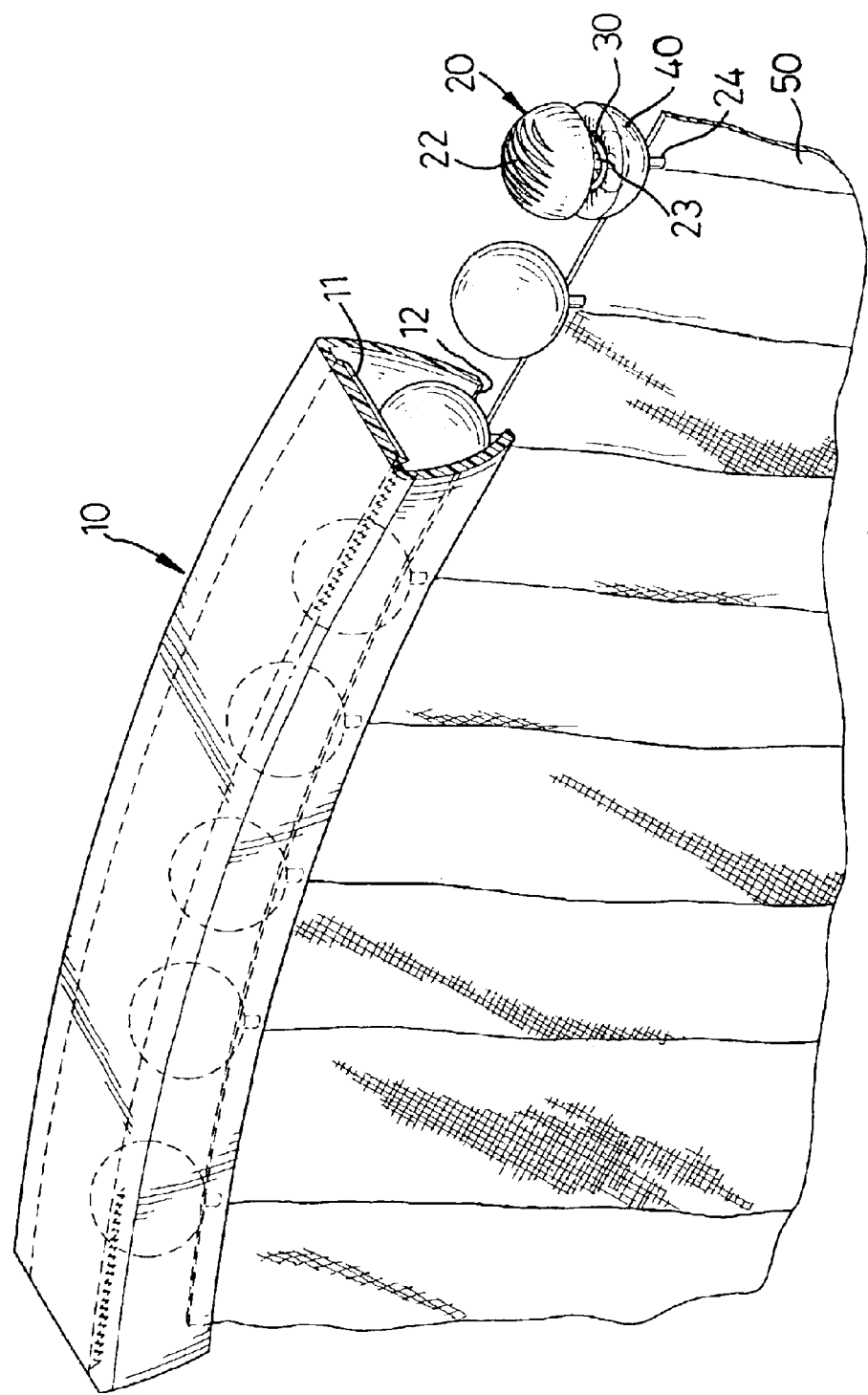

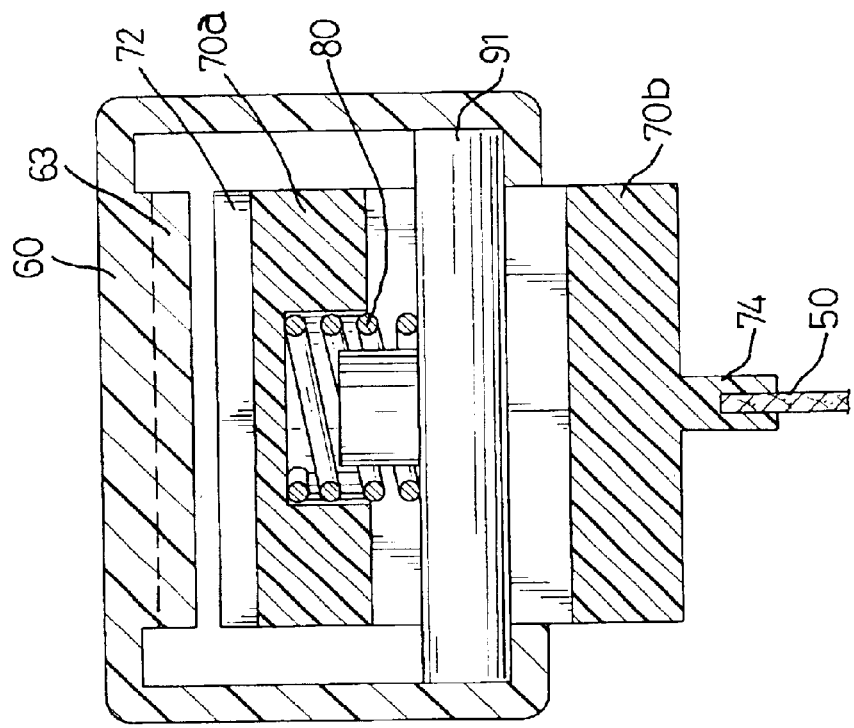
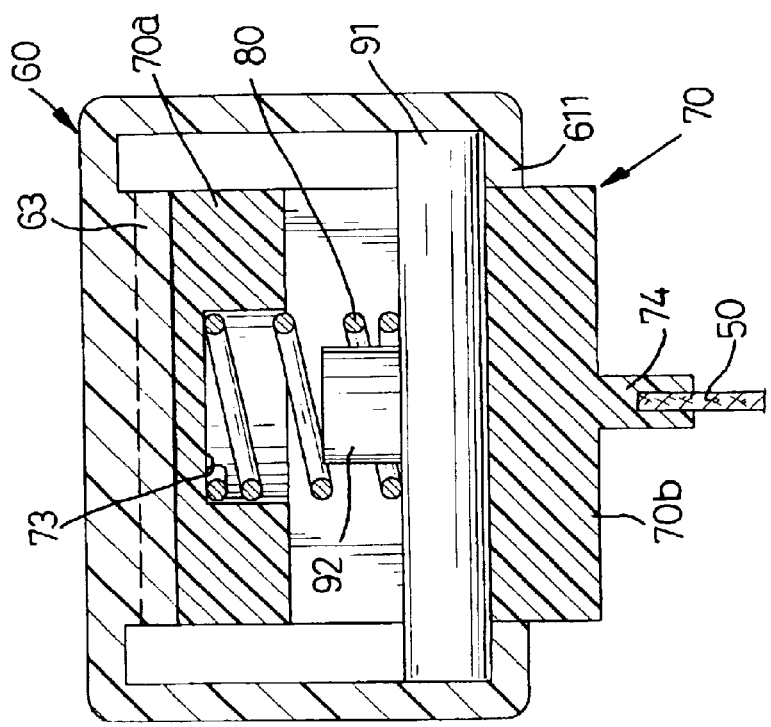

VEHICLE CURTAIN LOCK

BACKGROUND OF THE INVENTION

1. Field of the Invention

The present invention relates to a curtain lock, and more particularly to a curtain lock for a curtain of a vehicle window.

2. Description of Related Art

Curtains for vehicle windows are used to block sunlight and provide privacy inside the vehicle. A conventional curtain assembly for a vehicle window is composed of a track and multiple balls slidably mounted inside a track to hold a curtain over a vehicle window. The curtain can be opened or closed by sliding the balls inside the track. However, a conventional curtain assembly does not have a curtain lock to hold the curtain securely in position so the curtain is easily displaced when vehicle vibrates. Curtains over side windows having an inclined edge are particularly susceptible to opening or closing due to vehicular vibration and do not stay in a desired position.

The present invention has arisen to mitigate or obviate the disadvantages of the conventional curtain assembly.

SUMMARY OF THE INVENTION

The main objective of the present invention is to provide a curtain lock for a curtain that holds the curtain securely in position on a vehicle window.

Further benefits and advantages of the present invention will become apparent after a careful reading of the detailed description with appropriate reference to the accompanying drawings.

BRIEF DESCRIPTION OF THE DRAWINGS

FIG. 2 is a perspective view of the vehicle curtain lock in FIG. 1;

FIG. 7 is an operational cross-sectional side plane view of the vehicle curtain lock in FIG. 5 in a locked position; and FIG. 8 is an operational cross-sectional side plane view of the vehicle curtain lock in FIG. 5 in an unlocked position.

DETAILED DESCRIPTION OF THE PREFERRED EMBODIMENT

A vehicle curtain lock in accordance with the present invention comprises a U-shaped track, an abutting head, a sliding body, a resilient element and a clasp device. The U-shaped track has an inner channel and a longitudinal opening and slidably holds the sliding body, the abutting head and the resilient element inside the inner channel. The sliding body is mounted immediately inside the longitudinal opening to hold the abutting head inside the inner channel. The resilient element is mounted between the sliding body and the abutting head to push the abutting head against the U-shaped track to keep the sliding body in a locked position. The clasp device is connected to the abutting head and has a distal end with a clamp to hold a curtain. The abutting head can be selectively detached from the U-shaped track by pulling the curtain to allow the sliding head to slide freely along the U-shaped track.

Figure 1:
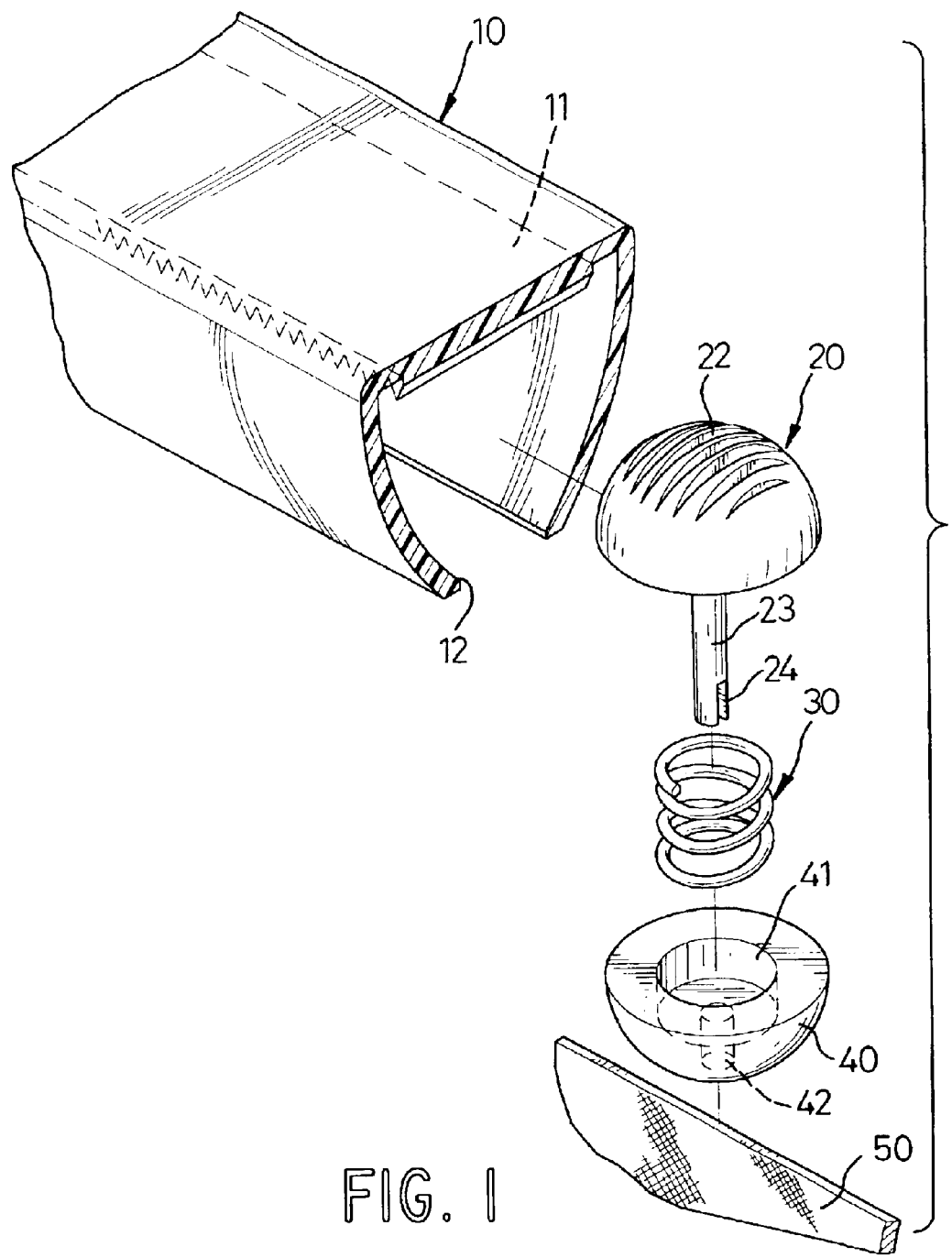
FIG. 1 is an exploded perspective view of a vehicle curtain lock in accordance with the present invention.

With reference to FIGS. 1 and 2, a first embodiment of a vehicle curtain lock in accordance with the present invention comprises a U-shaped track (10), an abutting head (20), a sliding body (40), a clasp device (not numbered) and a resilient element (30).

The U-shaped track (10) has a top (not numbered), two opposite sidewalls (not numbered), an inner channel (not numbered) and a longitudinal slit (12) and optionally a toothed strip (11). The longitudinal slit (12) communicates with the inner channel. The two opposite sidewalls are curved inward toward each other to define the inner channel and the longitudinal slit (12) open at distal ends of the sidewalls. The optional toothed strip (11) is attached to or formed on the top inside of the inner channel with teeth (not numbered) facing the inner channel.

The abutting head (20) is a hemisphere with a curved face (not numbered) and a flat face (not numbered) and is slidably mounted in the inner channel. The curved face presses against the top of the inner channel. Optionally, the curved face has multiple grooves (22) corresponding to the teeth on the toothed strip (11).

The sliding body (40) is also a hemisphere with a curved face (not numbered) and a flat face (not numbered), has a recess (41) and a through hole (42) and is mounted in the inner channel. The curved face presses against the longitudinal slit (12) in the U-shaped track (10). The recess (41) is defined in the flat face and has a bottom face. The through hole (42) is defined in the bottom face of the recess (41) through the sliding body (40).

The clasp device has a clasp post (23) and clasp (24). The clasp post (23) has a proximal end (not numbered) and a distal end (not numbered). The proximal end is integrally formed with the flat face of the abutting head (20). The clasp (24) is formed on the distal end of the clasp post (23) to hold a curtain (50) securely. The clasp post (23) is slidably mounted in the through hole (42) in the sliding body (40), and the clasp (24) protrudes out of the curved face of the sliding body (40).

The resilient element (30) is a coil spring mounted around the clasp post (23) between the abutting head (20) and the sliding body (40). The resilient element (30) is compressed between the abutting head (20) and the sliding body (40) to press the abutting head (20) against the top of the inner channel and the sliding body (40) against opposite sidewalls near the longitudinal slit (12).

Figure 4:
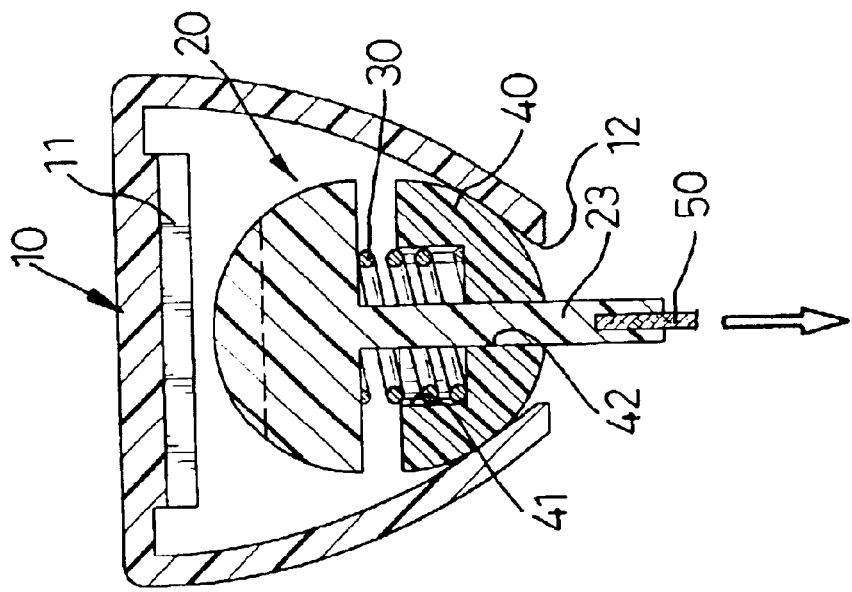
FIG. 4 is an operational cross-sectional side plane view of the vehicle curtain lock in FIG. 1 in an unlocked position.
Figure 3:
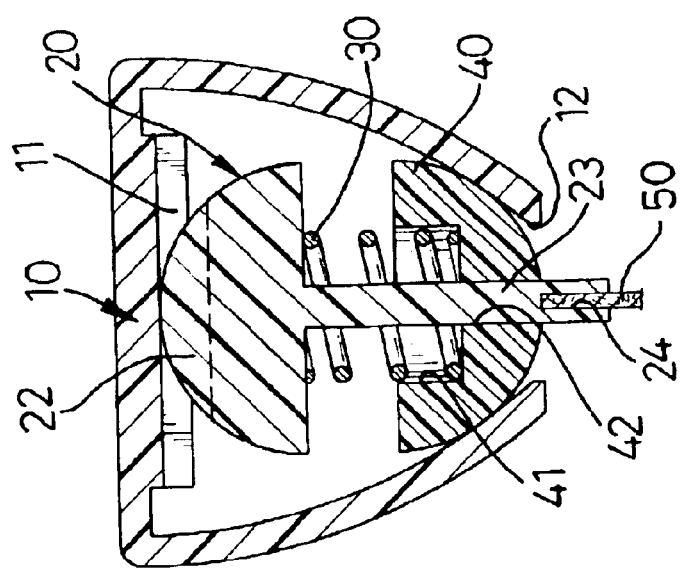
FIG. 3 is an operational cross-sectional side plane view of the vehicle curtain lock in FIG. 1 in a locked position.

With reference to FIGS. 3 and 4, the coil spring pushes the abutting head (20) against the top of the U-shaped track (10) to lock the vehicle curtain lock. When the toothed strip (11) is mounted in the U-shaped track (10) and the curved face of the abutting head (20) optionally has grooves (22), the grooves (22) engage the toothed plate (11) to hold the curtain lock more securely in place.

When the curtain (50) is pulled down, the clasp post (23) securely attached to the curtain (50) by the clasp (24) disengages the abutting head (20) from the top of the U-shaped track (10) so the sliding body (40) can freely slide inside the inner channel of the U-shaped track (10).

Therefore, the vehicle curtain lock is unlocked.

Figure 5:
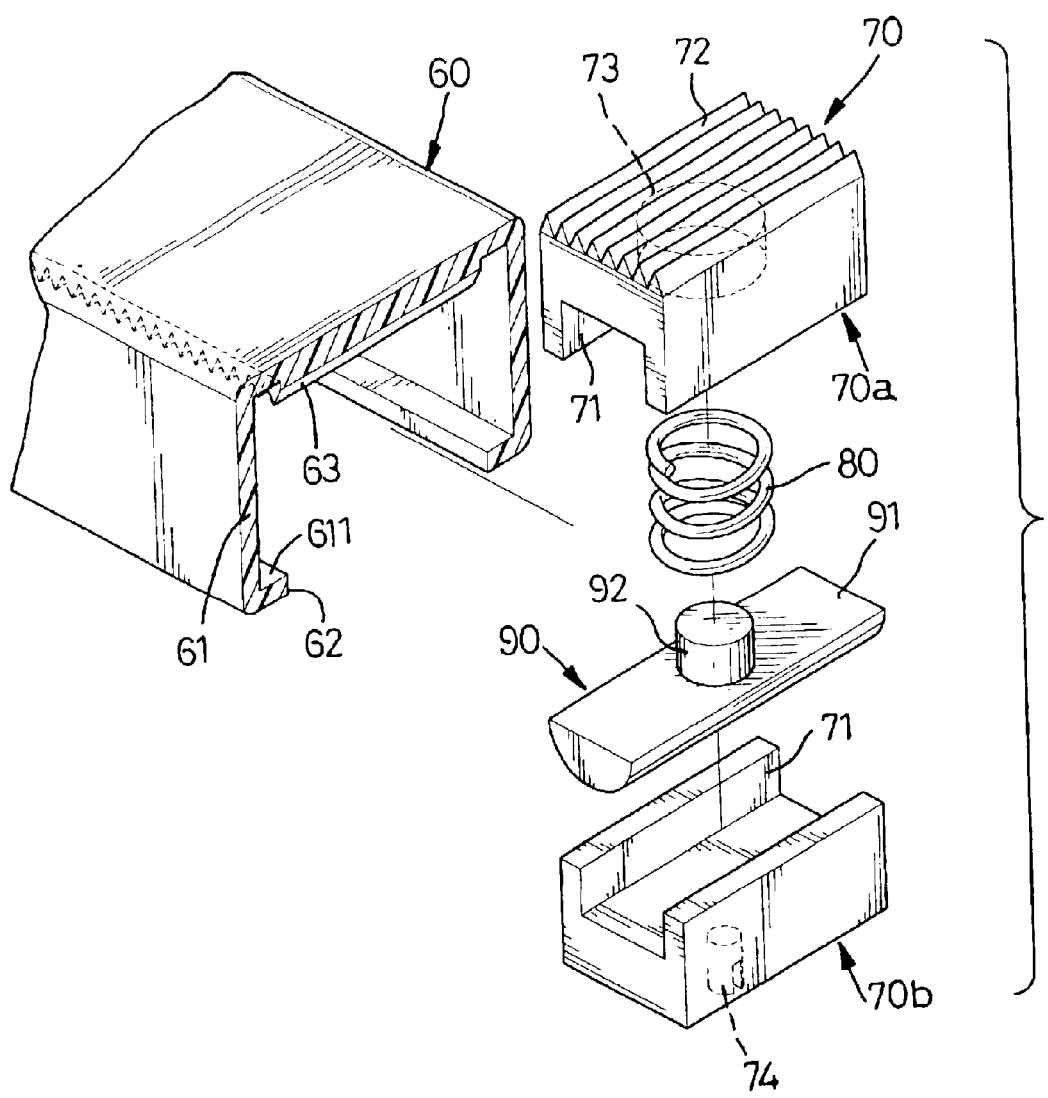
FIG. 5 is an exploded perspective view of second embodiment of a vehicle curtain lock in accordance with the present invention.
Figure 6:
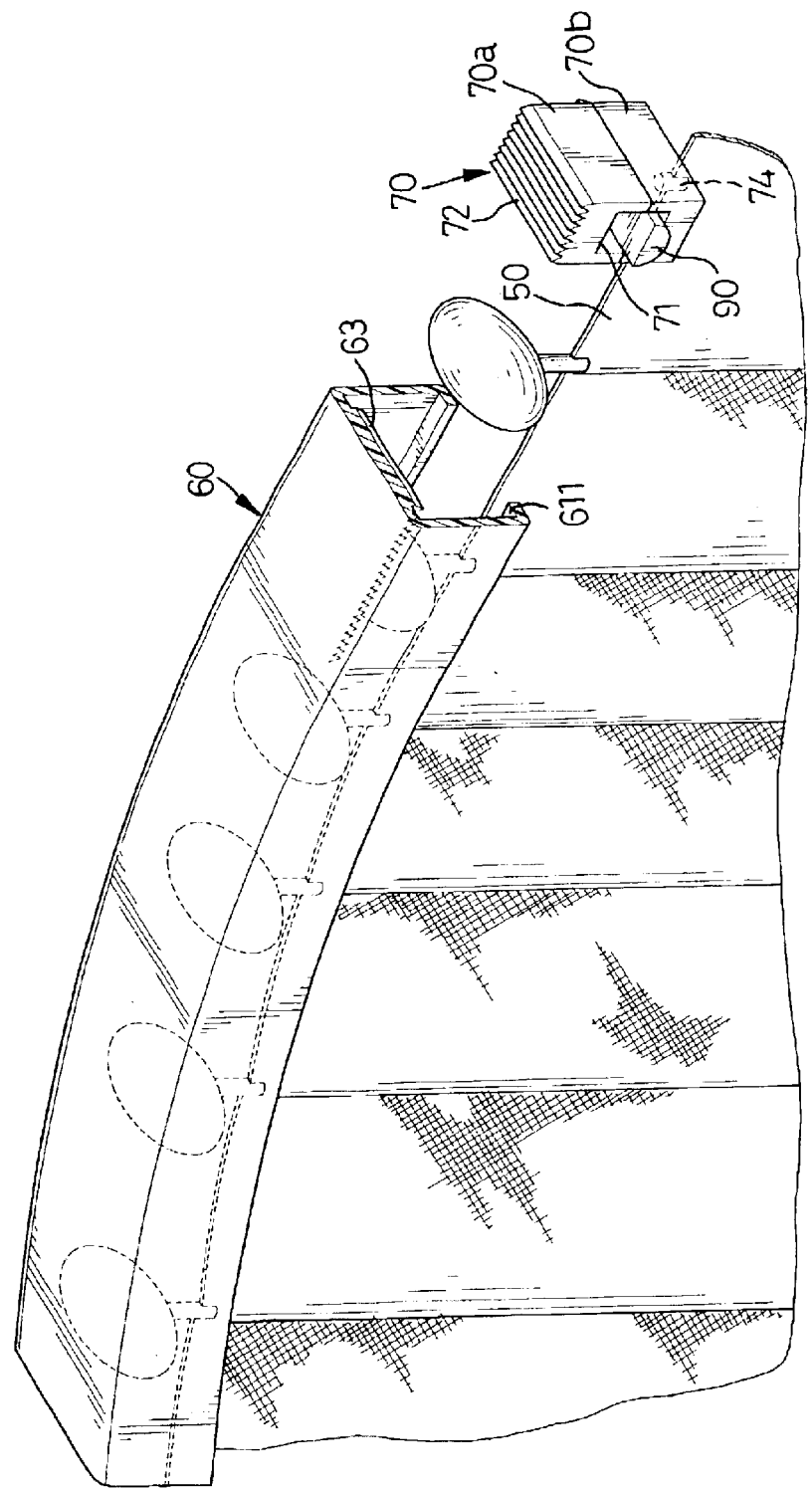
FIG. 6 is an operational perspective view in partial section of the vehicle curtain lock in FIG. 5.

With reference to FIGS. 5 and 6, a second embodiment of the vehicle curtain lock comprises a U-shaped track (60), an abutting head (70), a sliding body (90), a clasp device (not numbered) and a resilient element (80).

The U-shaped track (60) has a top (not numbered), a bottom (not numbered), two opposite sidewalls (61), an inner channel (not numbered) and a longitudinal opening (62) and optionally a toothed strip (63). The top of the U-shaped track (60) has a front edge (not numbered) and a rear edge (not numbered). The two opposite sidewalls (61) protrude perpendicular down respectively from the front edge to the rear edge of the top and respectively have distal edges (not numbered) and flanges (611). The flanges (611) are formed respectively at the distal edges of the sidewalls (61). The longitudinal opening (62) is defined in the bottom of the U-shaped track (60) between the flanges (611), has a transverse width and communicates with the inner channel in the U-shaped track (60). If included, the toothed strip (63) is attached to the top of the U-shaped track (60) inside the inner channel.

The abutting head (70) is a rectangular block composed of an upper U-shaped block (70*a*) and a lower U-shaped block (70*b*). The abutting head (70) has a transverse length shorter than the transverse width of the longitudinal opening (62) in the U-shaped track (60) to allow the abutting head (70) to moveably protrude through the longitudinal opening (62). Each U-shaped block (70*a*, 70*b*) has an opening (not numbered) and is attached to the other U-shaped block (70*a*, 70*b*) with the openings facing each other to form an inner cavity (71) inside the abutting head (70) to hold the resilient element (80) and the sliding body (90). The upper U-shaped block (70*a*) has an outer top face (not numbered) and an inner top face (not numbered) and optionally multiple teeth (72) and a recess (73). The teeth (72) are defined in the outer top face to correspond to the toothed strip (63) in the U-shaped track (60). The recess (73) is defined in the inner top face of the upper U-shaped block (70*a*) to hold the resilient element (80). The lower U-shaped block (70*b*) has an outer bottom face (not numbered).

The sliding body (90) has a semicylinder (91) and a post (92). The semicylinder (91) has a flat top face (not numbered), a curved bottom face (not numbered) and two ends (not numbered). The post (92) is formed on and protrudes from the flat top face of the semicylinder (91). The sliding body (90) is mounted in the inner cavity (71) of the abutting head (70) with the curved bottom face facing the lower U-shaped block (70*b*) and has a transverse length larger than the transverse width of the longitudinal opening (62) in the U-shaped track (60). The ends of the semicylinder (91) are slidably mounted on the flanges (611) of the U-shaped track (60).

The clasp device has a clasp post (not numbered) and a clasp (74). The clasp post has a proximal end (not numbered) and a distal end (not numbered). The proximal end is integrally formed with the outer bottom face of the lower U-shaped block (70*b*). The clasp (74) is formed on the distal end of the clasp post to hold a curtain (50).

The resilient element (80) is a coil spring with two ends (not numbered) and is mounted around the post (92) between the inner top face of the inner cavity (71) of the abutting head (70) and the flat top face of the semicylinder (91) of the sliding body (90). The resilient element (80) pushes the abutting head (70) against the top of the inner channel of the U-shaped track (60). Additionally, one end of the coil spring is mounted in the recess (73).

With reference to FIGS. 7 and 8, when the second embodiment of the curtain lock is locked, the coil spring pushes the abutting head (70) against the top of the U-shaped track (60). When the outer top face of the upper U-shaped block (70*a*) has the teeth (72) and the toothed strip (63) is mounted in the inner channel of the U-shaped track (60), the teeth (72) engage with the toothed strip (63) and hold the curtain lock in place more securely. When the curtain (50) is pulled downward, the clasp (74) attached to the curtain (50) disengages the abutting head (70) from the top of the U-shaped track (60). Therefore, the ends of the semicylinder (91) on the flanges (611) allow the sliding body (90) to freely slide inside the inner channel of the U-shaped track (60). The vehicle curtain lock is unlocked.

Although the invention has been explained in relation to its preferred embodiment, many other possible modifications and variations can be made without departing from the spirit and scope of the invention as hereinafter claimed.

What is claimed is:

1. A vehicle curtain lock comprising:
   a U-shaped track having a top, two sidewalls, an inner channel with a top and a longitudinal, opening formed between the two sidewalls opposite to the top, said top defining a toothed strip;
   an abutting head movably mounted inside the inner channel to selectively press against the top of the U-shaped track and having multiple grooves to engage the toothed strip;
   a sliding body slidably mounted inside the inner channel near the longitudinal opening in the U-shaped track under the abutting head to hold the abutting head inside the inner channel;
   a resilient element mounted between the sliding body and the abutting head to push the abutting head against the top of the U-shaped track to keep the curtain lock in a locked position; and
   a clasp device connected to the abutting head and having a distal end with a clasp to adapt to hold a curtain;
   whereby, the abutting head can be selectively detached from the U-shaped track by pulling the curtain to allow the abutting head to slide freely along the U-shaped track.

2. The vehicle curtain lock as claimed in claim 1, wherein the two sidewalls are curved inward toward each other to define the inner channel and the longitudinal slit (12) at distal ends of the sidewalls;
   the abutting head (20) is a hemisphere with a curved face and a flat face;
   the sliding body (40) is a hemisphere with a curved face and a flat face and has a through hole (42) defined through the sliding body (40); and
   the clasp device has
      a clasp post (23) moveably mounted in the through hole (42) in the sliding body (40) and has:
         a proximal end integrally formed with the flat face of the abutting head (20);
         a distal end protruding out of the through hole (42) in the sliding body (40) and out of the U-shaped track (10) via the longitudinal slit (12); and
         a clasp (24) formed on the distal end of the clasp post (23) to adapt to hold a curtain (50);
   wherein the curved face of the sliding body (40) corresponds to the inner channel to make the sliding body (40) slide smoothly;
   wherein the sliding body (40) is larger than the longitudinal slit (12) to hold the sliding body (40) in the U-shaped track (10).

3. The vehicle curtain lock as claimed in claim 2, wherein
the multiple grooves (22) defined in the curved face to correspond to the toothed strip (11) in the U-shaped track (10).

4. The vehicle curtain lock as claimed in claim 3, wherein the resilient element is a coil spring mounted around the clasp post (23); and
the sliding body (40) has a recess (41) with a bottom defined in the flat face to receive one end of the coil spring.

5. The vehicle curtain lock as claimed in claim 1, wherein
the top of the U-shaped track (60) has a front edge and a rear edge, and the sidewall (61) protrudes perpendicular down respectively from the front edge to the rear edge of the top and respectively have distal edges and flanges (611) formed respectively at the distal edges of the sidewalls (61) to define the longitudinal opening (62) with a transverse width between the flanges (611);

the abutting head (70) is a rectangular block with an inner cavity (71) defined through and inside the abutting head (70) and is composed of an upper U-shaped block (70a) with an inner top face and a lower U-shaped block (70b) with an outer bottom face and both U-shaped blocks (70a, 70b) having an opening facing each other to form an inner cavity (71);

wherein, the abutting head (70) has a transverse length shorter than the transverse width of the longitudinal opening (62) in the U-shaped track (60) to allow the abutting head (70) to moveably protrude through the longitudinal opening (62);

the sliding body (90) has a semicylinder (91) with a flat top face, a curved bottom face and two ends and a post (92) formed on and protruding from the flat top face, wherein the sliding body (90) is mounted in the inner cavity (71) of the abutting head (70) with the curved bottom face facing down and has a transverse length larger than the transverse width of the longitudinal opening (62) in the U-shaped track (60) to slidably mount the ends of the semicylinder (91) on the flanges (611);

the resilient element (80) is a coil spring mounted around the post (92) on the flat top face of the semicylinder (91) between the flat top face of the semicylinder (91) and the inner top face of the abutting head (70); and the clasp device has a clasp post with a proximal end integrally formed with the outer bottom face of the lower U-shaped block (70b) and a distal end on which a clasp (74) is formed to adapt to securely hold a curtain.

6. The vehicle curtain lock as claimed in claim 5, wherein the abutting head (70) further has a recess (73) defined in the inner top face inside inner cavity (71) of the upper U-shaped block (70a) to hold one end of the resilient element (80).

* * * * *